United States Patent [19]

Uematsu et al.

[11] Patent Number: 5,309,162
[45] Date of Patent: May 3, 1994

[54] AUTOMATIC TRACKING RECEIVING ANTENNA APPARATUS FOR BROADCAST BY SATELLITE

[75] Inventors: Masahiro Uematsu; Takashi Ojima, both of Tokyo; Kazuo Kato, Yokohama; Makoto Ochiai, Tokyo, all of Japan

[73] Assignees: Nippon Steel Corporation, Tokyo; System Uniques Corporation, Kanagawa, both of Japan

[21] Appl. No.: 988,893

[22] Filed: Dec. 10, 1992

[30] Foreign Application Priority Data

Dec. 10, 1991 [JP] Japan ................... 3-350103

[51] Int. Cl.$^5$ ............... H01Q 3/22; H01Q 3/24; H01Q 3/26
[52] U.S. Cl. .................... 342/372; 342/357; 342/442
[58] Field of Search ............ 342/372, 357, 442

[56] References Cited

U.S. PATENT DOCUMENTS

| 4,348,676 | 9/1982 | Tom . | |
| 4,626,860 | 12/1986 | Tricoles et al. | 342/442 |
| 5,021,792 | 6/1991 | Hwang | 342/357 |
| 5,089,824 | 2/1992 | Uematsu et al. | 342/359 |
| 5,101,356 | 3/1992 | Timothy et al. | 342/357 |

FOREIGN PATENT DOCUMENTS

| 0373604 | 12/1989 | European Pat. Off. . |
| 3432145 | 3/1986 | Fed. Rep. of Germany . |
| 2159802 | 6/1990 | Japan . |
| 1572478 | 7/1980 | United Kingdom . |

OTHER PUBLICATIONS

Electrical Communications vol. 49, No. 3, 1974, Brussels, BE pp. 204-217, Nollet et al. 'Advanced VHF Interferometer Spacecraft Tracking System' *p. 212, right column, paragraph 4*.

Primary Examiner—Theodore M. Blum
Attorney, Agent, or Firm—Pollock, Vande Sande & Priddy

[57] ABSTRACT

A satellite broadcast receiving antenna apparatus having an automatic tracking function for mobile bodies subject to radio wave interference due to obstacles is disclosed, in which phase correction circuits are arranged in the stage before a phase difference detection circuit, and the amount of phase shift of the phase correction circuits is adjusted by a CPU in such a manner that the peaks of the received signals are coincident in phase with each other at the time of detection thereof. The amount of phase shift associated with the coincidence is stored in a phase shift amount memory, and phase correction is effected on the amount of phase shift read from the memory is subsequent automatic tracking.

6 Claims, 7 Drawing Sheets

AUTOMATIC TRACKING RECEIVING ANTENNA APPARATUS FOR BROADCAST BY SATELLITE

CROSS-REFERENCE TO RELATED APPLICATION

This application relates to U.S. Ser. No. entitled "RECEIVING ANTENNA APPARATUS FOR BROADCAST BY SATELLITE" being filed by UEMATSU, Masahiro et al. and assigned to the present assignee, based on Japanese Application No. 3-350102 filed on Dec. 10, 1991 and the contents of which are incorporated herein by reference.

BACKGROUND OF THE INVENTION

1. Field of the Invention

The present invention relates to a mobile antenna apparatus mounted on a mobile body such as an automobile or a ship for receiving radio waves transmitted from an artificial satellite including a broadcast satellite.

A conventional antenna apparatus for a mobile body, as disclosed in JP-A-2-159802, has a flat antenna unit divided into a plurality of antennas. Drive signals of the flat antenna in the elevation and azimuth directions are generated from a phase angle representing a delay phase of a signal received by a second antenna with respect to that received by a first antenna, and motors are driven through motor drivers on the basis of the drive signals to control the antenna attitude, thereby performing automatic tracking to keep the antenna directed toward the satellite.

The conventional receiving antenna apparatuses for receiving satellite broadcast, which detect the direction to the satellite on the basis of phase difference between the received signal of a first antenna and that of a second antenna, have the disadvantage that once a signal delay occurs due to conduit length or wiring length or characteristics of intermediate circuit from the antenna to phase difference detection circuit, the phase difference detection circuit undesirably produces a phase difference output including the above-mentioned signal delay, which lead to erronous direction of the satellite. To obviate this problem, the wiring length is finely adjusted to eliminate the phase difference at the time of assemblage.

This adjustment of wire length is made on trial-and-error basis and consumes a long time.

SUMMARY OF THE INVENTION

Accordingly, it is an object of the present invention to provide an antenna apparatus of automatic tracking type for receiving the satellite broadcast in which the phase difference derived from difference in signal delays occurred in circuits is easily adjustable.

In order to achieve the above-mentioned object, according to one aspect of the present invention, there is provided an antenna apparatus for receiving the satellite broadcast, which comprises first and second antennas mounted on a mobile body and phase detection means for determining a phase difference signal between the received signal of the first antenna and that of the second antenna, wherein the first and second antennas are rotated on the basis of the phase difference signal to control the directions of the first and second antennas in such a manner as to be always directed toward the satellite.

The antenna apparatus of the present invention comprises peak detection means for detecting the peak of the received signal of first and second antennas, phase shifting means connected at one of the input terminals of the phase detection means for advancing or retarding the phase of an input signal applied to the input terminal, and a memory for storing the amount of phase shift of the phase shifting means, wherein the memory stores the amount of phase shift determined at the time of phase adjustment by changing the phase of the input signal at the phase shifting means in such a manner that the phases at the peaks of the received signals of the first and second antennas detected by the peak detection means coincide with each other, and afterward the amount of phase shift stored in the memory is read out and supplied to the phase shifting means thereby to correct the phase of the signal provided at one of the input terminals of the phase detection means.

According to another aspect of the present invention, there is provided a receiving antenna apparatus, wherein the amount of phase shift at the phase shifting means continues to be changed until the peak phases of the received signals of the first and second antennas detected by peak detection means coincide with each other at the time of phase adjustment, and the amount of phase shift at the time point when the peak phases coincide with each other is stored in the memory.

In the subsequent automatic tracking process, the amount of phase shift stored in the memory is read out and supplied to the phase shifting means, and the phase of the signal at one of the input terminals of the phase detection means is corrected, so that the phase detection means may detect only the real phase difference derived from deviation of the received signal from the satellite.

In this way, the input signals to the phase detection means from two antennas are in phase, and therefore the phase detection means detects the phase difference due to the actual distance errors from the satellite, thereby making possible correct detection of the satellite position. Also, the automatic phase adjustment saves the adjustment labor.

DETAILED DESCRIPTION OF THE PREFERRED EMBODIMENTS

Figure 1A:
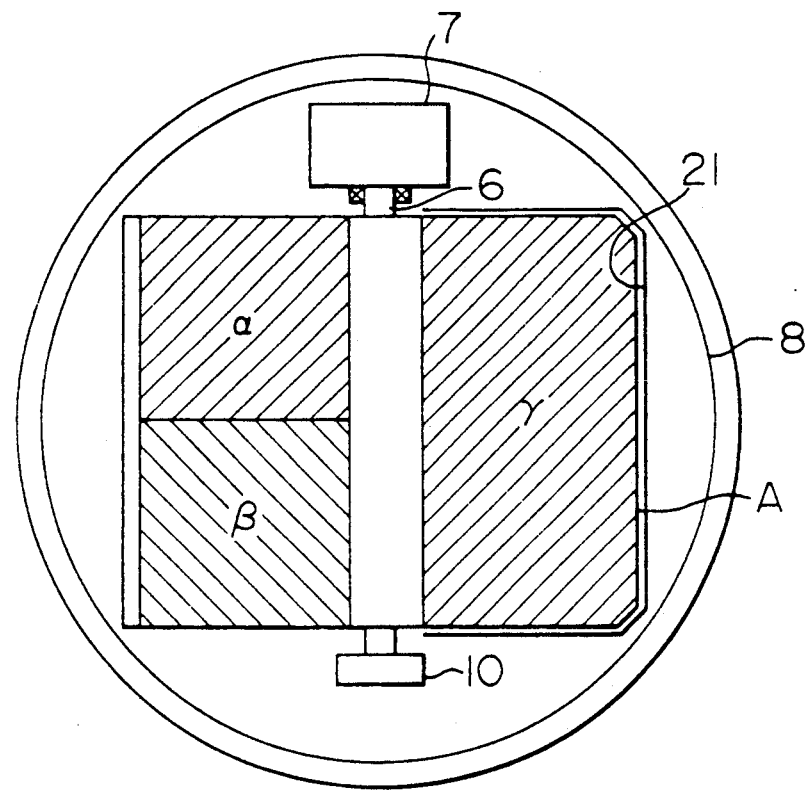
FIG. 1A is a front view of a receiving antenna apparatus for satellite broadcasting of automatic tracking type according to an embodiment of the present invention.
Figure 1B:
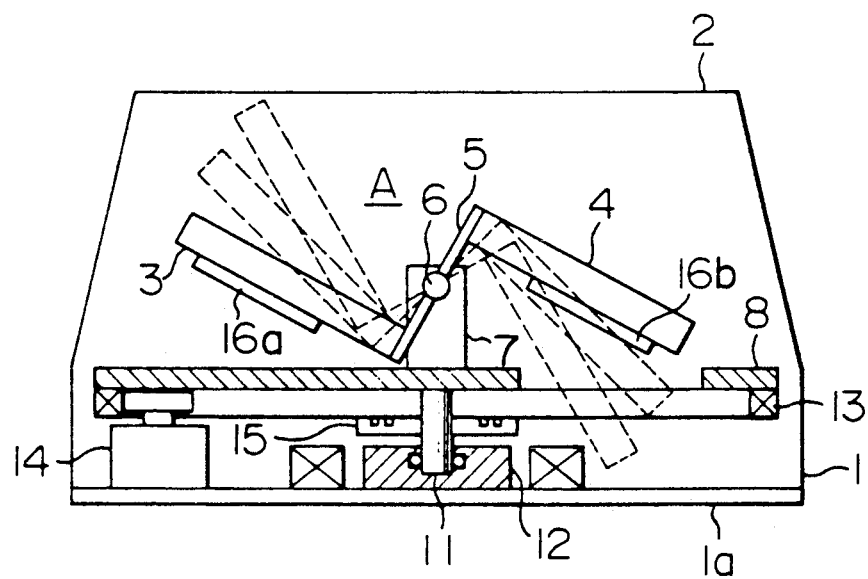
FIG. 1B is a sectional view showing the receiving antenna apparatus shown in FIG. 1A.

A construction of an antenna apparatus for a mobile body according to an embodiment of the present invention is shown in FIGS. 1A and 1B. FIG. 1A is a plan view of the antenna apparatus with a radome 2 removed, and FIG. 1B a partial side sectional view.

A housing 1 has the radome 2 covered thereon, and encloses all of circuits and mechanisms of the antenna therein. The antenna is configured as shown in FIG. 1B and installed on the roof of a train, an automobile or on a ship. An antenna unit A making up the essential part of the antenna according to the present invention includes a first antenna board 3 and a second antenna board 4 each providing a flat antenna, and a connecting plate 5 connecting the boards. These component parts are connected to substantially form the shape of Z as shown. The first antenna board 3 and the second antenna board 4 are connected to the connecting plate 5 at a declination from the right angle or tilt angle $\theta$. According to the present embodiment, the tilt angle $\theta$ is assumed as zero for simplification.

Figure 2:
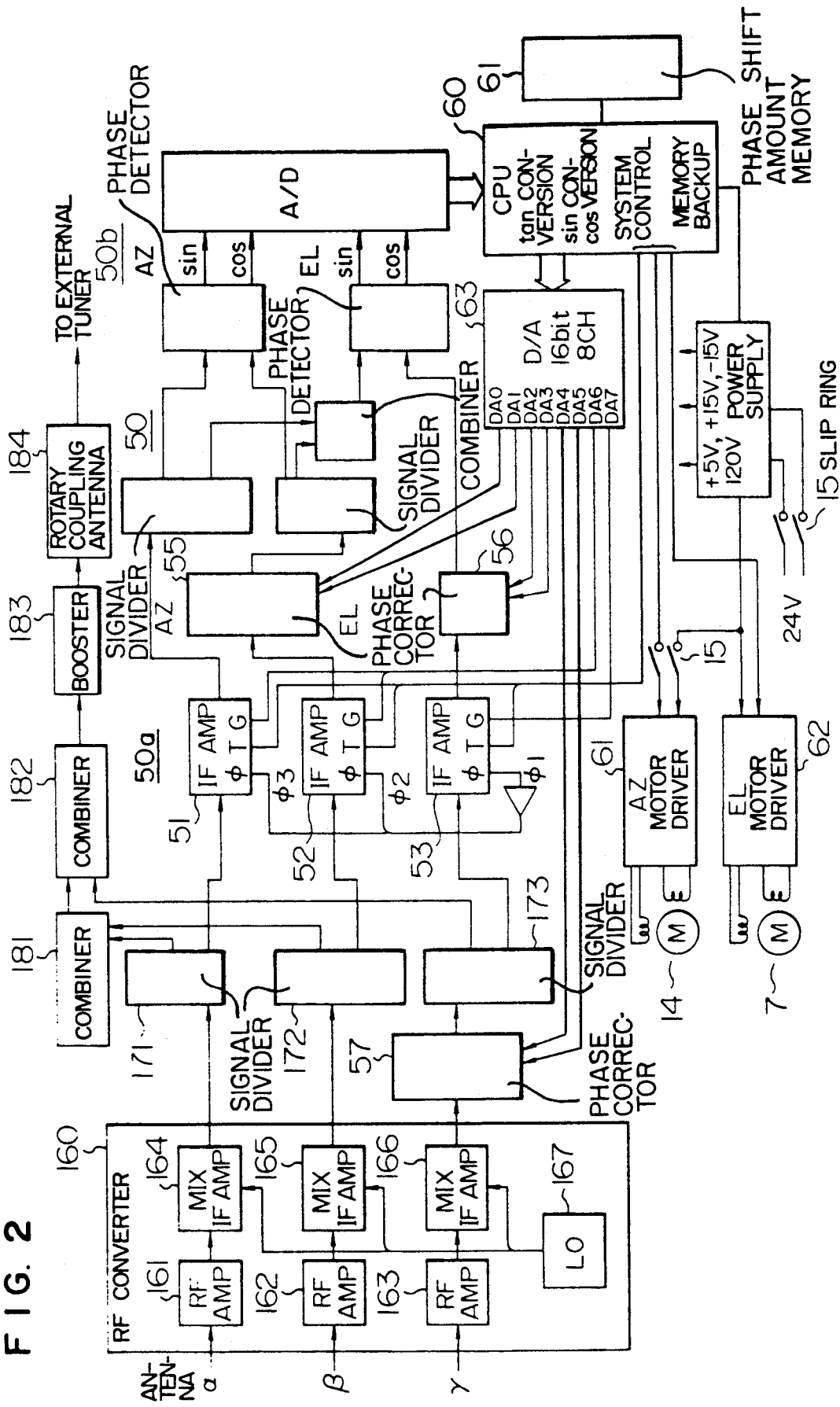
FIG. 2 is a diagram showing a circuit configuration of the antenna apparatus according to the same embodiment.

The tilt angle $\theta$ is set to at least 0° in such a manner that the first antenna board 3 and the second antenna board 4 are not overlaid one on the other in the direction of arrival of the receiving signal when the antenna unit A is rotated within the practical drive angle range along the elevation, or most preferably to 0° to 40° within the domestic practical drive angle range (23° to 53°) in Japan. The first antenna board 3 is mounted on its back side with a first antenna circuit 16a and the second antenna board 4 with a second antenna circuit 16b. The first and second antenna circuits 16a and 16b form a circuit shown in FIG. 2 which determines the direction of driving the antenna unit based on the phase difference between the received signals of the first antenna and the second antenna, and performs tracking control.

A rotary shaft 6 is at the central part of the connecting plate 5, and the antenna unit A is rotated about the rotary shaft 6 in the elevation direction by an elevation motor 7. The antenna unit A is supported on a rotary board 8 through a bearing plate 10. A rotary shaft 11 of the rotary board 8 is held on the housing 1 by a bearing 12. A toothed rubber belt is secured on the periphery of the rotary board 8. An azimuth motor 13 is fixed on the housing 1 in such a manner that the gear fitted in the rotary shaft of the azimuth motor 13 is in mesh with the belt teeth, with the result that the rotary board 8 rotates by 360° along azimuth direction with energization of the azimuth motor 13.

An output from the circuit mounted on the first and second antenna boards 3 and 4 is transmitted through a rotary coupling antenna 184 to external tuners. A control signal to the elevation motor 7 and power to the circuit are transmitted through a slip ring 15. A notch 21 is cut in the rotary board 8. The lowest position of the forward end of the second antenna board 4 driven around the rotary shaft 6 by the driving force of the elevation motor 7 reaches a point below the rotary board 8 in the housing.

A signal system for driving the antenna unit A will now be described. The first antenna board 3 is divided into two circuit portions designated as a flat antenna $\alpha$ and a flat antenna $\beta$ and the flat antenna mounted on the second antenna board 4 is designated as a flat antenna $\gamma$. Then the drive signal along azimuth direction in which the shaft 11 rotates is determined from the phase difference between the output signals of the flat antennas $\alpha$ and $\beta$ mounted on the first antenna board, and the drive signal along elevation direction in which the rotary shaft 6 rotates is determined from the phase difference between the output signal of the flat antenna $\gamma$ and the combined output signal of the flat antennas $\alpha$ and $\beta$.

The signals from the flat antennas $\alpha$, $\beta$ and $\gamma$ are supplied to an RF converter 16. The RF converter 16 includes RF amplifiers 161, 162 and 163, mixer-IF amplifiers (intermediate frequency amplifiers) 164, 165 and 166, and a dielectric oscillator 167. The outputs of the three antennas, after simple or in-phase combination at dividers 171, 172 and 173, and combiners 181 and 182, are provided to an external tuner through a rotary coupling antenna 184.

The outputs of the three antennas, after being divided at the diviers 171, 172 and 173, are applied also to an error signal processing circuit 50, converted into signals of second intermediate frequency (about 403 MHz) at BS tuners 51, 52 and 53, and supplied to the error signal detection circuit 50b. The error signal detection circuit 50b generates an azimuth error signal representing the declination angle between the direction from which the radio wave arrives and the directing direction of the antenna unit A projected on the azimuth rotary surface by use of the output signals of the BS tuners 51, 52 and 53, and an elevation error signal representing the declination angle between the direction of elevation and the direction of radio wave arrival. These signals are supplied to a drive control circuit (CPU) 60 for the elevation motor 7 and the azimuth motor 14.

The output signals of the BS tuners 52 and 53 are connected to phase correcting circuits 55 and 56 according to the present invention. The phase correcting circuit 55 operates to correct the phase difference caused by the difference in conduit length in the circuit and wire length between those from the RF amplifier 162 to the BS tuner (IF amplifier) 52 and those from the RF amplifier 161 to the BS tuner (IF amplifier) 51. The drive control circuit 60 controls the drive circuits 61 and 62 of the elevator motor 7 and the azimuth motor 14 by the azimuth error signal and the elevation error signal thereby to drive the antenna unit A in such a manner as to eliminate errors. The error signal processing circuit 50 includes an elevation error signal detector and an azimuth error signal detector.

The azimuth error signal and the elevation error signal or $\sin\theta$ and $\cos\theta$ generated at the error signal correcting circuit 50b are applied to the CPU 60 after A/D conversion. The CPU 60 determines an azimuth offset data (Da) and an elevation offset data (De) representing the amount of correction of the direction of the antenna unit A on the basis of the error signals, with the former data transferred to an azimuth motor driver 61 and the latter data to an elevator motor drive 62.

Figure 4:
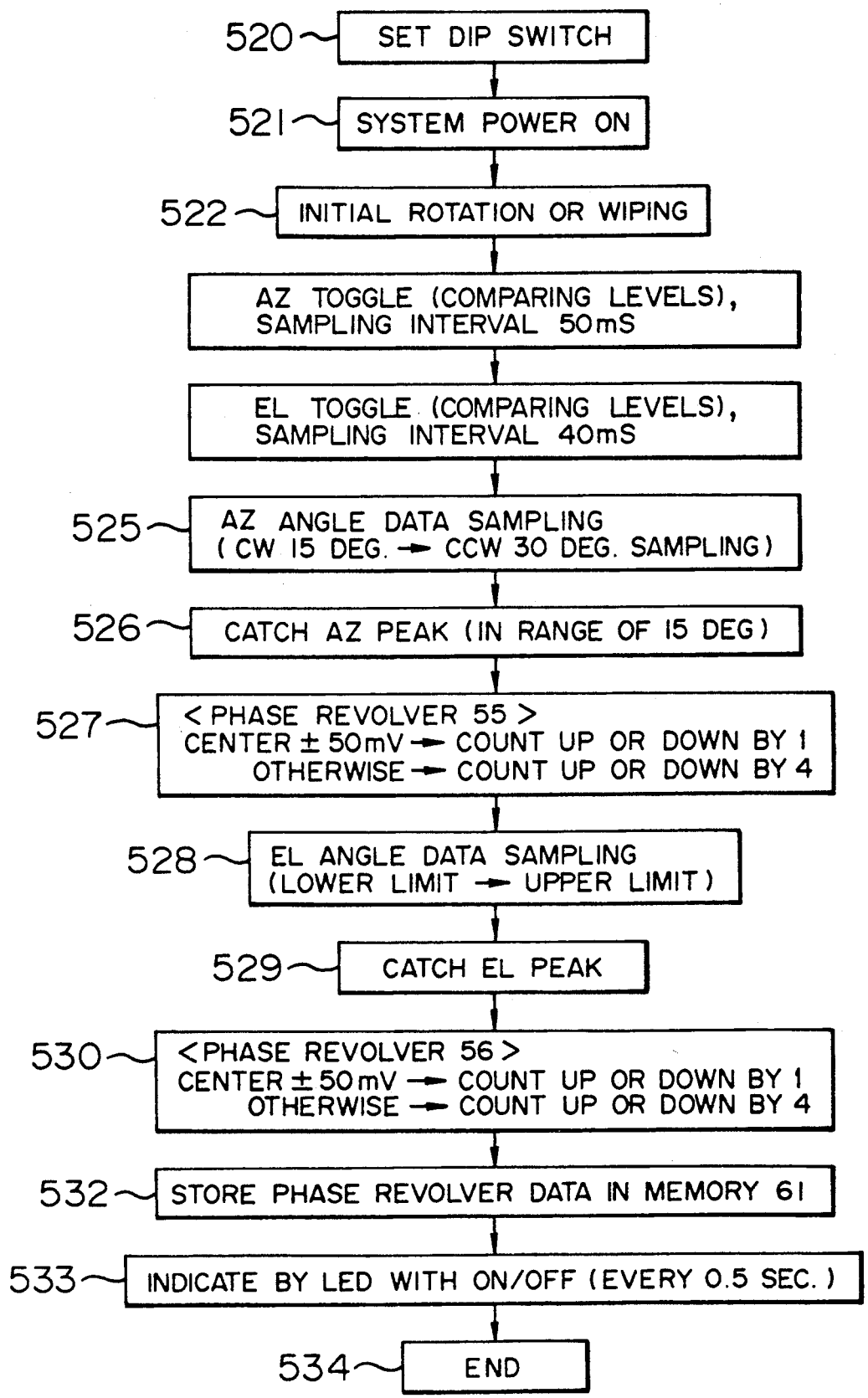
FIG. 4 is a flowchart for explaining the procedure for registration of the phase correcting data for the circuit shown in FIG. 2.
Figure 5:
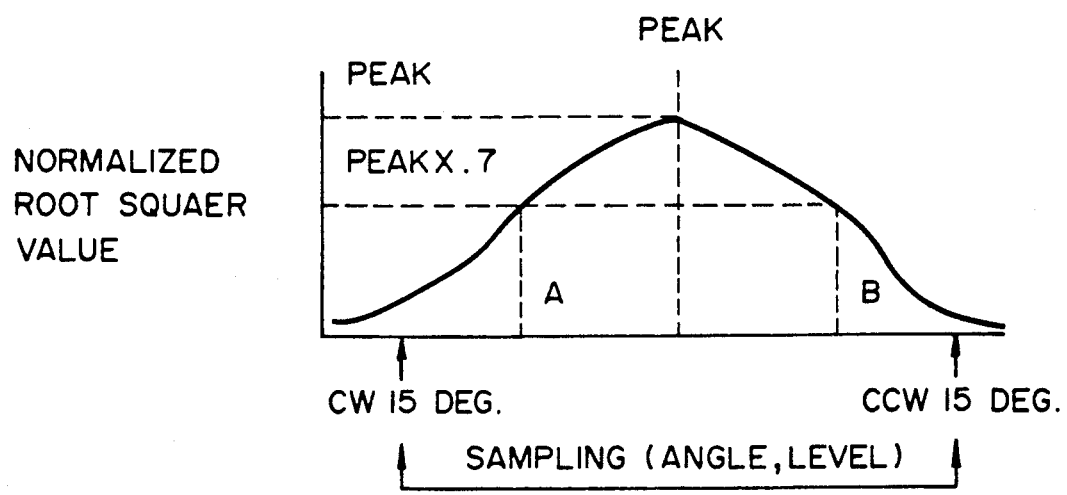
FIG. 5 is a diagram for explaining the peak detection in the circuit shown in FIG. 2.

The phase adjusting operation for the whole system including the procedure for registration of the phase-correcting data will be explained. As shown in FIG. 4, after the initialization (step 522), the circuit gain with an optimum input level of the phase corrector is held, and an A/D conversion value of the error signal generated at the error signal detecting circuit 50b is introduced to the CPU 60. After that, the signal peak is roughly searched for by a hill climbing method, that is, by level comparison of the received signals obtained from the mean square of the sine and cosine components of the azimuth error signal with a prior level (steps 523 and 524). At the next step, a fine search is effected by phase comparison. With the clockwise rotation by 15 degree in the azimuth direction, followed by the counterclockwise rotation by 30 degree, the receiving data within the angular range of 30 degree is sampled (step 525) for detecting the peak in the azimuth direction (step 526). As shown in FIG. 5, two points A and B of the level 70% of the peak value are determined, and a signal peak is regarded to exist at a point associated with the rotational angle intermediate the two points A and B. This is in order to prevent any pseudo peak which may be generated by noises or the like from being taken as a true peak.

Another reason is that as far as a waveform is laterally symmetric as a whole even in the presence of a noise, the middle point between two points sliced at signal level substantially coincides with the angle associated with the peak. Under this condition, the output signals of the tuners 51 and 52 are displaced in phase from each other. The phase correcting circuit 55 is thus operated to shift the phase (step 527). By rotation along the elevation (step 528), a peak is detected (step 529), and the phase is adjusted by the phase correcting circuit 56 in the same way as the azimuth adjustment (step 530), thus completing the phase adjustment. The resulting correction value is stored in the phase shift amount memory 61 as a data for phase correction (step 532), and the end of adjustment is indicated (step 533), thus completing the whole process of the phase adjustment.

As explained above, the correction value is changed quickly at the CPU 60 to find a point where signals are in phase for automatic phase adjustment, thus saving the adjustment labor. At the subsequent time of automatic tracking control, the phase amount stored in the phase shift amount memory 61 is read out as a phase-correcting data and is supplied to the D/A converter circuit 57. Therefore, subsequent phase detection is made possible without any phase deviation which otherwise might be caused by the difference in the signal delay amount of the circuit.

Figure 3:
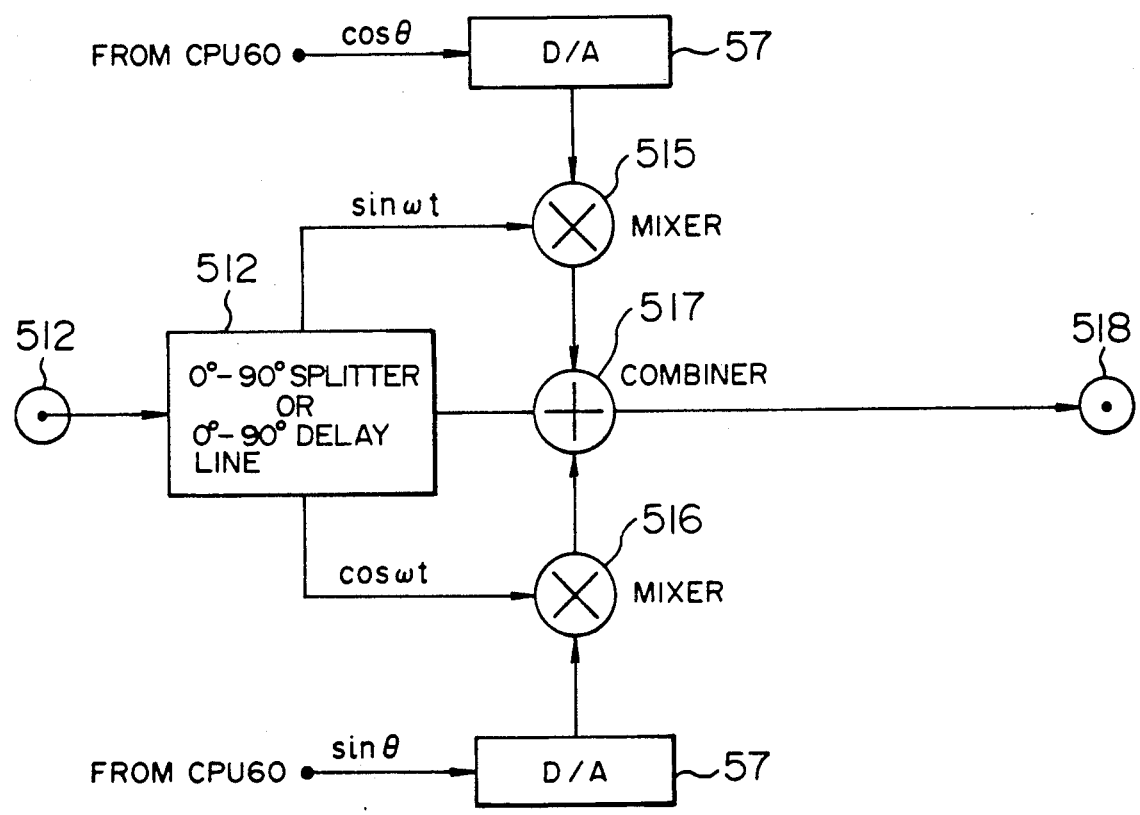
FIG. 3 is a diagram showing phase correction circuits 55 and 56 in FIG. 2.

Now, the principle of a phase shifting method by phase correcting circuits 55 and 56 will be explained. The phase-correcting circuits 55 and 56, as shown in FIG. 3, include a signal input terminal 511, a 0°–90° splitter (or 0°–90° delay line) 512 for separating the received signal $\sin \omega t$ into a sine signal component and a cosine signal component, a D/A converter 57 connected to the CPU 60, a first multiplier circuit (or mixer) 515 connected to the 0°–90° splitter 512 and the D/A converter 57 for multiplying the sine signal component with the second correction $\cos\theta$ supplied from the CPU 60, a second multiplier circuit (or mixer) 516 connected to the 0°–90° splitter 512 and the D/A converter 57 for multiplying the cosine signal component with the first correction $\sin\theta$ supplied from the CPU 60, an adder circuit (or combiner) 517 for adding the output of the first multiplier circuit 515 to the output of the second multiplier circuit 516, and an output terminal 518. The CPU 60 and the D/A converter 57 operate as a correction signal generation circuit for generating a first correction signal $\sin\theta$ and a second correction signal $\cos\theta$.

One of the receiving signals applied to the phase correction circuits 55 and 56 is separated into a sine signal component and a cosine signal component at the 0°–90° splitter 512. The correction signal generation means including the CPU 60 generates a first correction signal $\sin\theta'$ and a second correction signal $\cos\theta'$ in accordance with the phase deviation of the input signal. The sine signal component is multiplied by the second correction signal $\cos\theta'$ at the first multiplier circuit 515, and the cosine signal component by the first correction signal $\sin\theta'$ at the second multiplier circuit 516. The outputs of the first and second multiplier circuits are given as $\sin \omega t \times \cos\theta'$ and $\cos \omega t \times \sin\theta'$ respectively.

The outputs of the multiplier circuits 515 and 516 are added to each other at the adder circuit 517 thereby to produce a signal having a shifted phase from the input signal. The output of the adder circuit 517 is given as $\sin \omega t \times \cos\theta' + \cos \omega t \times \sin\theta'$. According to the addition theorem of the trigonometric function, the output is rewritten as $$\sin \omega t \times \cos \theta' + \cos \omega t \times \sin \theta' = \sin(\omega t + \theta') \qquad (1),$$

where calculations are executed in a unit circle. If an input signal is out of phase with the other input signal by the phase difference $\theta'$ the sine signal component and the cosine signal component of the input signal are given as $\sin(\omega t + \theta)$ and $\cos(\omega t + \theta)$ respectively. Therefore, equation (1) is expressed as $$\sin(\omega t+\theta) \times \cos\theta' + \cos(\omega t+\theta) \times \sin\theta' = \sin\{(\omega t+\theta)+\theta'\} \qquad (2).$$

Let the rotational angle $\theta'$ of the first correction signal $\sin\theta'$ and the second correction signal $\cos\theta'$ be $$\text{rotational angle } \theta' = -\text{phase difference } \theta \qquad (3),$$

then a signal free from the phase difference $\theta$ is produced at the output of the phase shifting means.

In the case where the absolute value of the phase difference $\theta$ is measurable in advance, the rotational angle $\theta'$ of the first correction signal $\sin\theta'$ and the second correction signal $\cos\theta'$ may be outputted at once as equal to a minus phase difference $\theta$, although the rotational angle $\theta'$ may be gradually increased or decreased to approach the minus phase difference $\theta$. The latter method is adopted by the present embodiment.

In this way, the input signals to the phase detection means from two antennas are in phase, so that only the phase difference due to the difference in distance from the satellite is detected, thereby making possible correct detection of the satellite position.

The operation of the present invention will be explained more specifically with reference to FIGS. 6A and 6B. Assume that the vectorial direction of the receiving signal is as shown by POINT in FIG. 6A. If this signal is to be moved to the position of zero in sine component as a control standard by being rotated in phase in the counterclockwise direction, the signal in the phase position designated by POINT, in FIG. 6B is added. The relationship between the rotational angle $\theta'$, $\sin\theta'$ and $\cos\theta'$ in FIG. 6B is stored in a table, with reference to which a correction signal is determined according to the rotational angle $\theta$. This signal is applied to a D/A converter as a 16-bit digital correction signal. This table stores data described with 45/256 degree (obtained by dividing one full rotation of 360° by 2048) as a unit.

Figure 7:
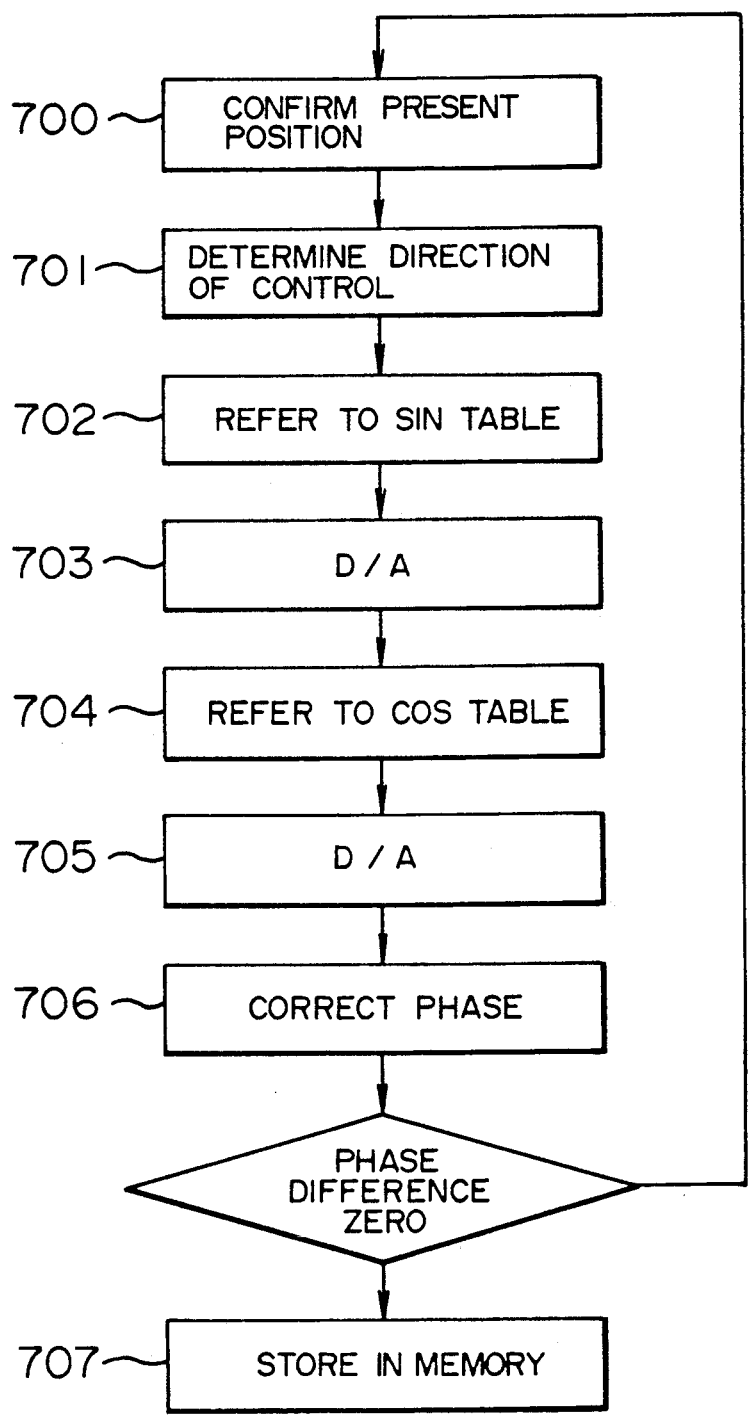
FIG. 7 is a flowchart for explaining the phase-correcting operation in the circuit shown in FIG. 2.

Now, explanation will be made about the operation for determining the amount of phase shift at the time of phase adjustment with reference to the flowchart shown in FIG. 7. First, the received signal is separated into the sine signal component and the cosine signal component, and the vectorial position of the received signal is determined from the sign and value of the sine signal component and the cosine signal component, thereby determining the direction of control (step 701). In the case where the received signal is not in the vicinity of the center, the correction signal is increased or decreased for every four units of the control amount, while if the received signal is in the vicinity of the center, fine control is effected by changing the correction signal for every unit.

Figure 6A:
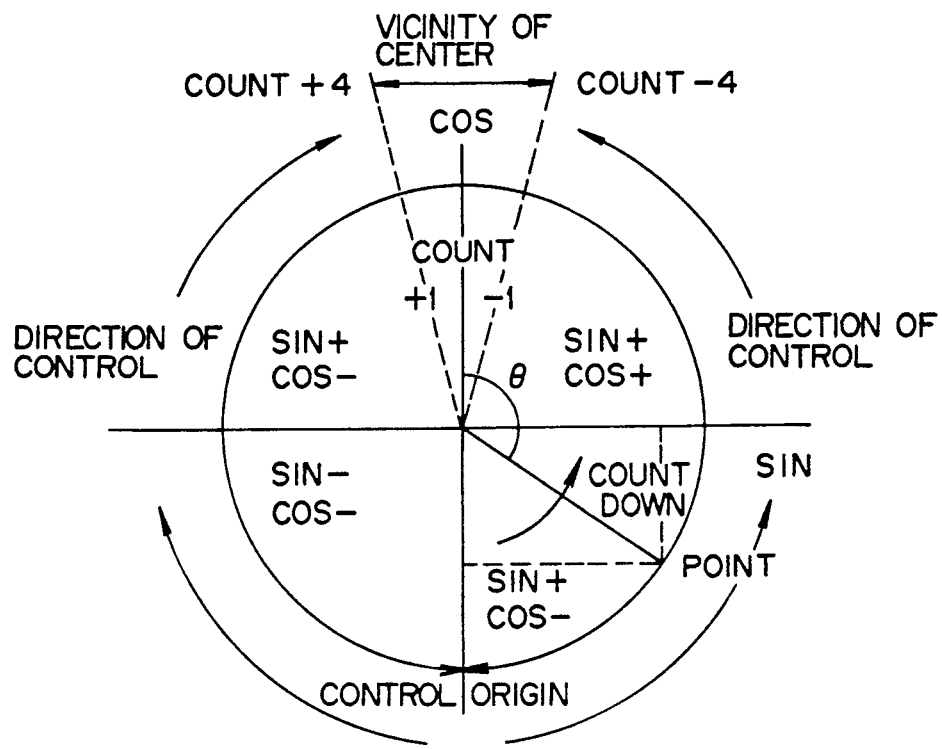
FIG. 6A is a diagram showing the position of the vector of the received signal in the circuit shown in FIG. 2, before compensation.
Figure 6B:
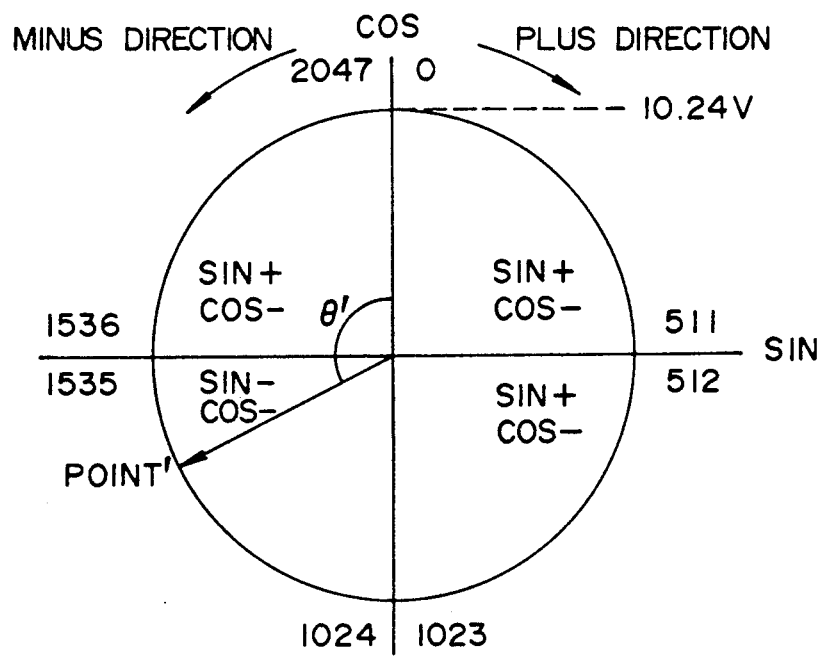
FIG. 6B is a diagram showing the position of the vector to be compensated of the received signal in the circuit shown in FIG. 2.

In FIG. 6A, the POINT is located in the fourth quadrant. In order to turn the POINT to the center, the correction signals $\sin\theta'$ and $\cos\theta'$ are set with an increment angle $\theta'$ of $4\times 45/256$ degree calculated from the value read from the table (steps 702 and 704) and applied to the first and second multiplier circuits (or mixers) 515 and 516 (steps 703 and 705). Then, the output of the phase correcting circuit 55 changes (step 706). This operation is repeated with an increment angle 45/256 degree after entering in the vicinity of zero until the phase difference becomes zero. When the phase difference reaches zero, the phase shift amount data supplied to the D/A converter 57 is stored in the phase shift amount memory 61 (step 107).

As explained above, according to the present embodiment, the automatic adjustment made so that the peaks of the receiving signals coincide with each other facilitates the adjustment.

It will thus be understood from the foregoing description that according to the present invention there is provided a satellite broadcast receiving antenna apparatus of automatic tracking type in which the phase difference attributable to the difference in signal delay of the circuit is adjusted in simple fashion.

We claim:

1. An automatic tracking receiving antenna apparatus used in broadcast by satellite, to be mounted on a mobile body comprising:
   a first antenna mounted on said mobile body for receiving a radio signal emitted from said satellite and providing a first received signal;
   a second antenna mounted on said mobile body for receiving said radio signal and providing a second received signal;
   a phase detection means having two input terminals for detecting a phase difference between said first received signal and said second received signal and providing a phase difference signal; and
   a control means for controlling rotation of said first and second antennas on the basis of said phase difference signal so as to direct beam directions of said first and second antennas toward said satellite, said receiving antenna apparatus further comprising:
   a peak detection means for detecting power peaks of said first and second received signals;
   a phase corrector for receiving a received signal and correcting phase of said received signal with respect to a reference signal;
   a phase shifting means for shifting phase of an input signal applied to one of the input terminals of said phase detection means; and
   a memory for storing a predetermined phase shift value for a phase shift to be shifted by the phase shifting means, wherein said predetermined phase shift value is determined from a phase shift necessary to be made by said shifting means to obtain a phase at said power peak of said first received signal coinciding with a phase at said power peak of said second received signal in a phase adjustment operation, and wherein in a tracking operation said shifting means reads out said predetermined phase shift value from said memory and corrects a phase of said input signal of said phase detection means based on said predetermined phase shift value.

2. An automatic tracking receiving antenna apparatus according to claim 1, wherein said predetermined phase shift value is determined from a phase shift for said phase shifting means to make said phase at said power peak of said first received signal coincide with that of said second received signal for said phase adjustment operation so as to compensate a phase difference between two input signals applied to said two input terminals of said phase detection means derived from a difference between a signal delay occurred from said first antenna through inner circuits to said one input terminal of said phase detection means and a signal delay occurred from said second antenna through inner circuits to another input terminal of said phase detection means.

3. An automatic tracking receiving antenna apparatus for receiving broadcast by satellite and to be mounted on a mobile body comprising:
   a first antenna mounted on a first plane and having a first beam direction for receiving a radio signal emitted from said radio signal and providing a first received signal;
   a second antenna mounted on said first plane and having a second beam direction parallel to said first beam direction for receiving said radio signal and providing a second received signal;
   a third antenna mounted on a second plane disposed in parallel with an offset from said first plane in said first beam direction and having a third beam direction parallel to said first beam direction for receiving said radio signal and providing a third received signal;
   an azimuth phase direction means having two input terminals for detecting a phase difference between said first received signal and said second received signal and providing an azimuth phase difference signal;
   an elevation phase detection means having two input terminals for detecting a phase difference between said third received signal and at least one of said first received signal and said second received signal and providing an elevation phase difference signal; and
   a phase shifting means mounted on selected one of said azimuth phase detection means and said elevation phase detection means, said phase shifting means for compensating a phase difference $\theta$ between two input signals applied to said two input terminals of said phase detection means and derived from a signal delay occurred in transmitting one of said received signals from one of said antennas to one of said input terminal of said phase detection means.

4. An automatic tracking receiving antenna apparatus according to claim 3, wherein said phase shifting means includes:
   a 0°-90° splitter for receiving one of said received signal and separating said received signal into a sine component and a cosine component;
   a correction signal generating means for generating a first correction signal of $A\cos\theta$ and a second correction signal of $A\sin\theta$ corresponding to said phase difference $\theta$, where A represents an arbitrary amplitude;

a first multiplying means for making a first product from said sine component and said first correction signal;

a second multiplying means for making a second product from said cosine component and said second correction signal; and an adding means for adding said first product and said second product.

5. An automatic tracking receiving antenna apparatus for receiving broadcast by satellite and to be mounted on a mobile body comprising:

a first antenna mounted on said mobile body for receiving a radio signal emitted from said satellite and providing a first received signal;

a second antenna mounted on said mobile body for receiving said radio signal and providing a second received signal;

a phase detection means having two input terminals for detecting a phase difference between said first received signal and said second received signal and providing a phase difference signal;

a control means for controlling rotation of said first and second antennas on the basis of said phase difference signal so as to direct beam directions of said first and second antennas toward said satellite; and a phase shifting means for compensating a phase difference $\theta$ between two input signals applied to said two input terminals of said phase detection means, said phase difference being derived from different signal delays occurred in signal transmission from said respective antennas to said respective input terminals.

6. An automatic tracking receiving antenna apparatus according to claim 5, wherein said phase shifting means includes:

a 0°-90° splitter for receiving one of said received signal and separating said received signal into a sine component and a cosine component;

a correction signal generating means for generating a first correction signal of A $\cos\theta$ and a second correction signal of A $\sin\theta$ corresponding to said phase difference $\theta$, where A represents an arbitrary amplitude;

a first multiplying means for making a first product from said sine component and said first correction signal;

a second multiplying means for making a second product from said cosine component and said second correction signal; and an adding means for adding said first product and said second product.

* * * * *